(12) United States Patent
Huang et al.

(10) Patent No.: US 9,749,780 B2
(45) Date of Patent: Aug. 29, 2017

(54) METHOD AND APPARATUS FOR MOBILE LOCATION DETERMINATION

(75) Inventors: Joseph Ding-Jiu Huang, Kingston (CA); David Benjamin Millman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1037 days.

(21) Appl. No.: 13/983,414

(22) PCT Filed: Jan. 11, 2012

(86) PCT No.: PCT/US2012/020875
§ 371 (c)(1),
(2), (4) Date: Aug. 2, 2013

(87) PCT Pub. No.: WO2012/106075
PCT Pub. Date: Aug. 9, 2012

(65) Prior Publication Data
US 2013/0317944 A1  Nov. 28, 2013

Related U.S. Application Data

(60) Provisional application No. 61/439,876, filed on Feb. 5, 2011.

(51) Int. Cl.
*H04W 24/00* (2009.01)
*H04W 4/02* (2009.01)
(Continued)

(52) U.S. Cl.
CPC ............. *H04W 4/02* (2013.01); *G01S 5/0252* (2013.01); *G01S 5/0263* (2013.01); *G06Q 30/0623* (2013.01); *H04W 64/00* (2013.01)

(58) Field of Classification Search
CPC ........ H04W 64/00; H04W 4/02; H04W 48/04
See application file for complete search history.

(56) References Cited

U.S. PATENT DOCUMENTS 3,621,584 A    11/1971  Burt et al.
6,091,956 A     7/2000  Hollenberg
(Continued)

FOREIGN PATENT DOCUMENTS

CN       1553688      12/2004
EP     1 494 397       1/2005
(Continued)

OTHER PUBLICATIONS

International Search Report and Written Opinion in International Application No. PCT/US2012/020875, mailed Mar. 21, 2012, 7 pages.
(Continued)

*Primary Examiner* — Steve D Agosta
(74) *Attorney, Agent, or Firm* — Fish & Richardson P.C.

(57) ABSTRACT

A method of generating a user?s location using a mobile device. The method comprises, determining a signal snapshot on the mobile device, the signal snapshot describing characteristics of unregulated radio frequency (RF) transmissions detectable by the mobile device. Generating the user?s location on the mobile device using the signal snapshot and at least one additional input from the mobile device. The generating and determining are iteratively repeated. The unregulated RF transmission can comprise WiFi signals.

12 Claims, 6 Drawing Sheets

(51) Int. Cl.
   *G01S 5/02*     (2010.01)
   *G06Q 30/06*    (2012.01)
   *H04W 64/00*    (2009.01)

(56) References Cited

U.S. PATENT DOCUMENTS

| | | | |
|---|---|---|---|
| 6,393,294 B1* | 5/2002 | Perez-Breva | H04W 64/00 342/451 |
| 7,551,574 B1* | 6/2009 | Peden, II | H04L 63/102 370/310 |
| 8,350,758 B1 | 1/2013 | Parvizi et al. | |
| 8,738,024 B1* | 5/2014 | Kerr | G01S 5/0252 342/458 |
| 2004/0263388 A1* | 12/2004 | Krumm | G01C 21/206 342/451 |
| 2005/0040968 A1* | 2/2005 | Damarla | H04W 64/00 340/5.53 |
| 2007/0049286 A1* | 3/2007 | Kim | G01S 5/0252 455/456.1 |
| 2008/0312946 A1 | 12/2008 | Valentine et al. | |
| 2009/0105950 A1 | 4/2009 | Arteaga et al. | |
| 2010/0109864 A1* | 5/2010 | Haartsen | G01C 21/206 340/539.13 |

FOREIGN PATENT DOCUMENTS

| | | |
|---|---|---|
| JP | 2002-315042 | 10/2002 |
| JP | 2005-295380 | 10/2005 |
| JP | 2007-537614 | 12/2007 |
| JP | 2009-150663 | 7/2009 |
| JP | 2009-159336 | 7/2009 |
| JP | 2009/264747 | 11/2009 |
| JP | 2009-270884 | 11/2009 |
| JP | 2010-130520 | 6/2010 |
| JP | 2010-146030 | 7/2010 |
| JP | 2012-507701 | 3/2012 |
| WO | WO 2010/052531 | 5/2010 |
| WO | WO 2010/106530 | 9/2010 |

OTHER PUBLICATIONS

International Preliminary Report on Patentability in International Application No. PCT/US2012/020875, dated Mar. 22, 2013, 17 pages.
Supplementary European Search Report in Application No. 12742569.2, dated Oct. 27, 2015, 8 pages.
Japanese Office Action for Application No. 2015-095224, dated Jan. 23, 2017, 4 pages (With English Translation).

* cited by examiner

METHOD AND APPARATUS FOR MOBILE LOCATION DETERMINATION

RELATED CASES

This is a non-provisional application of provisional application Ser. No. 61/439,876 by Huang et al., filed 5 Feb. 2011, entitled "The present invention relates to a solution to Wireless or Signal Strength Based Mapping and Localization and more specifically to the simultaneous or real-time or post-processing mapping and/or localization of received and/or transmitted wireless and/or signal-strength information together with any combination of odometry, human interaction, or environmental context."

BACKGROUND

Field

This disclosure is generally related to location determination using mobile devices. More specifically, the disclosure is related to techniques that do not rely on GPS for location determination.

Related Art

Mobile positioning via a mixture of GPS, cell towers, and previously mapped RF transmitters, e.g. WiFi access points, is commonly available. Such positioning is usually only accurate to approximately 7-25 meters—but can be 250 meters off in failure cases. Further, indoor environments tend to be poor for GPS reception, necessitating reliance on other mechanisms. One mechanism for improving reception is to make use of cell towers, e.g. use information about signal intensity from multiple known cell towers to triangulate an approximate location (200-1000 m accuracy). Another approach is to use a database of known WiFi transmitters, or other unregulated radio frequency (RF) transmitters.

For example, Skyhook Wireless provides software-only location mapping with about 10-20 meter accuracy using a database of known WiFi access points, GPS satellites and cell towers to compute a location. A core requirement for services like Skyhook Wireless is a reference database of WiFi access points. This database must be generated manually, e.g. via field surveys, manual data entry. Other companies such as Apple make use of the GPS in mobile devices to record a WiFi base station. These databases themselves must be regularly maintained and updated to provide good accuracy. Maintenance of such databases can require expensive monitoring equipment, trained field teams to survey locations, and regular updates. Additionally, such approaches do not address changing signal environments due to crowded-vs-empty areas, or changing signal conditions due to obstruction of the mobile devices' antenna(e) by the users' hands as the user changes the way in which he/she is holding the mobile device.

Still other approaches for indoor location determination such as those using ray tracing propagation models for indoor signal strength modeling, Sparse Extended Information Filter and GraphSLAM based approaches, or those approaches based on dead reckoning require prior information about the shape, layout, and sometimes materials of the location, e.g. shape priors. This approach can work if there are pre-existing maps and shape information that an authoritative source can provide. However, such an approach is often too computationally complex to run within the constraints of a mobile device or does not always work well in changing, or dynamic, environments.

Accordingly, what is needed is a method and apparatus for location determination on mobile devices without the need for prior information about the location, e.g. information about either the space itself or the unregulated RF transmitters/transmissions in the space.

DETAILED DESCRIPTION

Figure 1:
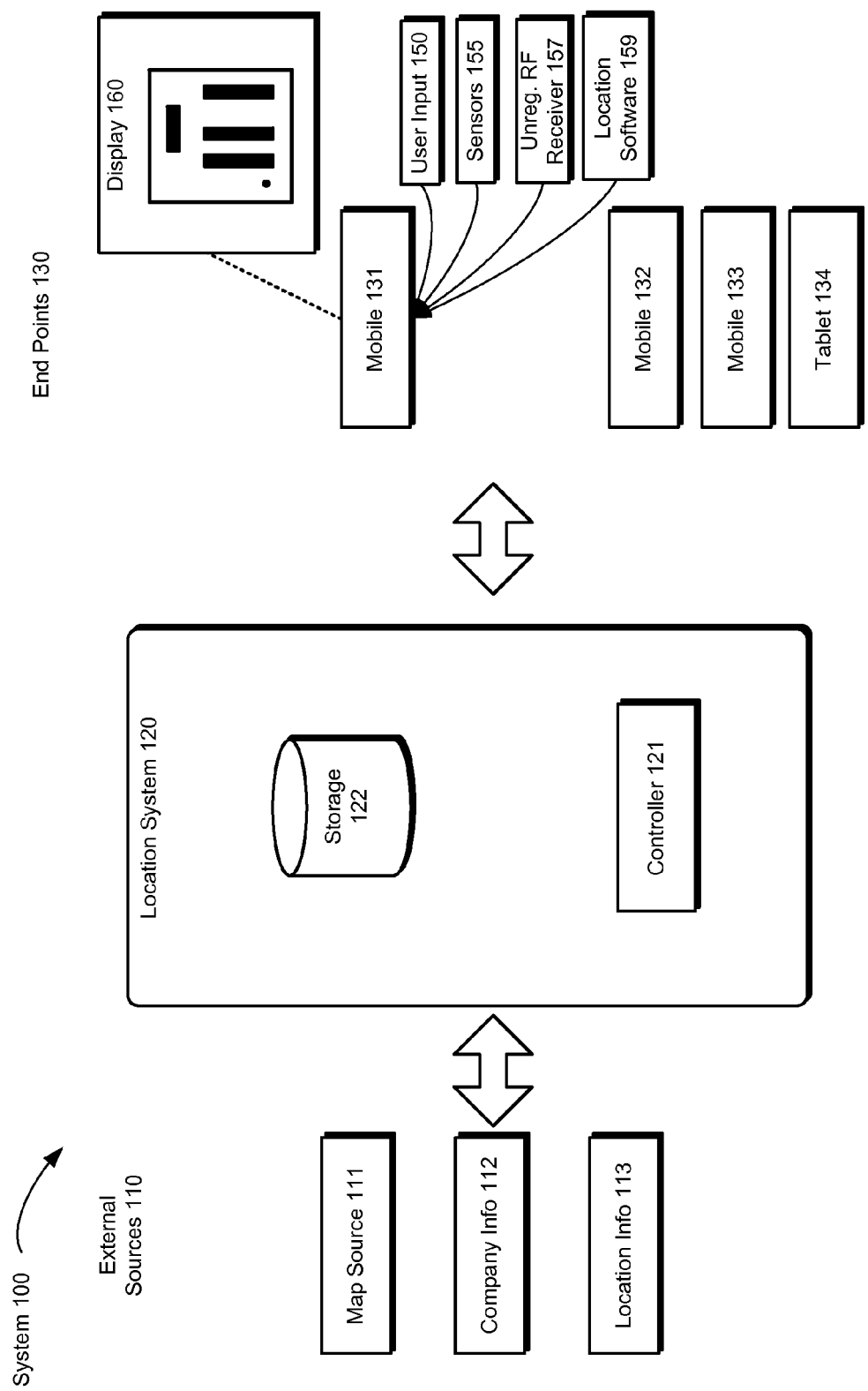
FIG. 1 shows an architectural level schematic of a system in accordance with an embodiment.

Related Cases . . . 1
Background . . . 1
  Field . . . 1
  Related Art . . . 2
Brief Description of the Figures . . . 3
Detailed Description . . . 3
  Overview . . . 4
  Terminology . . . 7
  System Overview . . . 8
  Positioning . . . 16
  Further Improving Signal Maps . . . 30
  Examples and Further Discussion . . . 35
  Conclusion and Additional Embodiments . . . 37
Claims . . . 45
Abstract . . . 51

Overview

The discussion is organized as follows. First, an introduction describing some of the problems addressed by various embodiments will be presented, followed by an explanation of terminology that will be used throughout the discussion. Then, a high level description of one embodiment will be discussed at an architectural level. Next, the details of processes used by some embodiments will be discussed. Then, some applications will be discussed. Lastly, various alternative embodiments are discussed.

Let's consider Lane visiting a convention. Because the space was set up at the last minute, there is no mapping of the WiFi access points in the convention center, some of which may have been replaced recently and not surveyed, some of which were erected by booths for the show, etc. However, the convention organizers likely have a general map of the show floor with exhibitor names that they can load into the mobile application for the convention. At the convention center, Lane pulls out his mobile phone and launches the mobile application, or website, for the convention, e.g. XYZ Convention 2011. It is desirable to provide Lane an easy way to track his path through the convention floor, ensure that Lane visits all of the exhibitors on his list of people to see, and do so on the mobile device even when GPS is poor or unavailable, and even if the landscape of the convention floor has changed since the map was finalized. In this context GPS may be poor both in terms of signal quality, but also in terms of high power requirements. Further, existing alternatives to GPS may also be too costly, e.g. pre-mapping locations or establishing pre-determined beacons within the location. Other features may include better accuracy in finding and meeting up with others at the convention. Other features may include optimal routes to visit booths you've expressed interest in. Other features may include handling for congestion in an area, e.g. dynamically suggesting alternative routes based on congestion in a part of the convention floor. Similar features could be used for route planning at large locations like theme parks with attractions if the location system 120 can contact a data source, e.g. in company info 112 or a third-party website, providing information about wait times for attractions. Additionally, such a feature could take into account congestion caused by events such as parades and shows. Other features can include providing a browsing history, e.g. booths you've visited; interactivity with the exhibits, e.g. displaying content relevant to the nearby booths; and/or personalization, e.g. depending on your interests, different information is shown. In the personalization context, for example, medical doctors registered at a medical convention might see different information than hospital administrators when near the same booth.

Other uses for better mobile location determination include shopping, e.g. at a mall generally, and within a store such as a department store, grocery store, pharmacy, specialty boutique, etc. For example, if Lane were using the XYZ Mall Application to wander through the XYZ Mall, he could receive targeted advertising as he approaches certain stores. Similarly, users looking at (adjacent to) a Brand X diaper display within a store could be offered coupons for that brand of diapers or a competitor's diaper. In some embodiments, a price checking functionality is supported. This embodiment could be offered by a competitor that uses knowledge of one store's layout, e.g. Safeway #123, to suggest lower priced alternatives they sell or as a brand competition mechanism, you are near Pepsi right now, but just a few meters down, there is a special on Coke. Other embodiments can include, providing supplemental nutritional information on nearby products; providing reviews from other web sites and/or your social network(s) about nearby products; and/or providing supplemental information, e.g. highlighting products already on sale, advising of future sales.

Notably uses of the embodiments go beyond basic "check in" at a location to providing improved functions around a user's more precise location. For example, in the shelf position example, accuracy of closer to 1 m, optionally supplemented with other information such as heading (looking at the diapers or the other side of the aisle), movement speed (standing still in front of the diapers vs. walked right past), is important.

Although embodiments make use of communications and may use public networks such as the internet, e.g. for communication from the mobile devices to a server, one important feature is the relatively low amount of communication with the server. The minimal communication overhead enables the servers to scale to handle millions and millions of users even when the end points are from different providers and/or supporting different applications. Note that in some embodiments, there is no communication and/or all communication is offline of the location determination process. However, in some embodiments, some entities may set up a dedicated server that mobile devices could connect to. The minimal communication needs also help handle tens of thousands of devices in large venues over bandwidth-limited networks like cellular. For example, all thirty-thousand-plus attendees at a concert location with mobile devices could all easily use the location system 120 without significant bandwidth impacts. Additionally, because power consumption in mobile devices needs to be carefully managed, embodiments make use of particularly power-friendly computational techniques for location determination.

The use by some embodiments of WiFi transmissions for location determination takes advantage of a combination of WiFi's ubiquity as well as an ability to make use of the transmission without the need for the mobile device to connect to a network using the WiFi transmission. Specifically, a WiFi beacon with the MAC address is sufficient for mapping purposes. Additionally, from a power consumption standpoint, mobile devices may already be programmed to periodically scan for WiFi access points, some embodiments leverage such periodic scans and/or increase the frequency of such scans to build location and mapping information.

Additionally, embodiments make modified use of techniques drawn from fields of robotics such as SLAM (simultaneous location and mapping) including FastSLAM variants to provide mobile location determination. Embodiments make use of machine learning techniques, structured probabilistic models, Bayesian filtering, and sequential importance resampling to provide mobile location determination.

We describe a system and various embodiments to provide improved mobile location determination.

Terminology

Throughout this specification the following terms will be used:

Mobile Device:

A mobile device is a portable electronic device such as a mobile phone, smartphone, or the like. Current exemplary mobile devices include iOS devices such as the iPhone, and Android devices such as the Nexus smartphone or Kindle tablets. Generally, some embodiments are targeted at small, handheld devices that a user can both easily transport and use while walking. Generally, the mobile device can have multiple sensors integrated such as accelerometers, and gyroscopes as well as multiple receivers such as GPS, cellular, a WiFi, and Bluetooth. Additionally, the mobile device will have a display and user input capabilities. Notably, embodiments may make particular use of inputs common on mobile devices such as buttons and touch inputs, a camera to decode barcodes, QR-codes, and/or other image analysis as well as microphones for voice recognition and/or sound analysis. Thus, the definition of mobile device could include portable electronic devices other than a smartphone such as tablets or portable, or laptop, computers, and their peripheral devices.

Unregulated Radio Frequency (RF) Transmitter, Unregulated RF Transmission:

An unregulated radio frequency (RF) transmitter or transmission refers to RF transmitters/transmissions where there is not a regime of government regulation for positioning the transmitter/transmission sources. For example, cellular towers used for 3G/LTE are regulated RF transmitters. Similarly, GPS satellites are viewed as regulated RF transmissions. In contrast, unregulated RF transmitters are deployed in an ad hoc fashion, e.g. WiFi base stations, Bluetooth devices, near field communications (NFC) transmitters. Certain RF sources do not neatly fall into one category or the other, e.g. microcells/picocells for cellular communications. However, for purposes of this discussion, the term "unregulated" focuses on transmitters/transmissions where the transmitters can be moved/installed/changed regularly. There is an additional emphasis in some embodiments on WiFi transmitters/transmissions because of their ubiquity. Additionally, even if the position of the transmitters is allegedly known, it may be insufficient. For example, managed WiFi networks where the installer is supposed to record the location of the WiFi device are reported to often contain inaccurate location information. Thus, such information, where available, could be an input to some embodiments for coarse location determination.

Location:

Location is used to refer to two distinct concepts in this document; the usage should be apparent from context. The first meaning refers to the general area you are in, e.g. the XYZ store #123, the ABC Convention Center, Central Park or a region within Central Park. The second meaning refers to the more precise position of the mobile device, and thus the user. Specifically, this second meaning of location can be a global coordinate, e.g. latitude/longitude plus altitude/floor or a relative x, y, z coordinate. This second meaning of location may also be referred to as position.

System Overview

A system and various embodiments to provide improved mobile location determination will be described with reference to FIG. 1, which shows an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes external sources 110, location system 120, and end points 130. The external sources 110 include map source 111, company info 112, and location info 113. The location system 120 includes a controller 121 and storage 122. The end points 130 include mobile 131, mobile 132, mobile 133, and tablet 134. Mobile 131 is coupled in communication with a display 160 showing a user interface generated by a combination of location software on the mobile 131 and location system 120 in accordance with one embodiment. Additionally, user input 150 to mobile 131 is shown, as well as sensors 155, an unregulated RF receiver 157 and location software 159.

The interconnection of the elements of system 100 will now be described. The external sources 110 are coupled in communication to the location system 120 (indicated by double-headed line with arrows at end). The different sources may arrive via different mechanisms. For example, the map source 111 may be retrieved over a network, e.g. the internet, using one or more protocols, such as HTTP using various APIs such as REST or SOAP. Other information such as the company info 112 or the location info 113 may be accessed over a different network, e.g. private network, VPN, MPLS circuit, or internet, and may be obtained using any appropriate API or download mechanism, e.g. SFTP download of data for processing and storage by the location system 120. All of the communications may be encrypted and, as appropriate, the decryption credentials may be available to the location system 120 directly, or may be stored in storage 122 in encrypted form. Additionally, a variety of authentication techniques such as username/password, OAuth, Kerberos, and more can be used for the communications between the external sources 110 and the location system 120.

Controller 121 and storage 122 can be composed of one or more computers and computer systems coupled in communication with one another. They can also be one or more virtual computing and/or storage resources. For example, controller 121 may be an Amazon EC2 instance and the storage 122 an Amazon S3 storage. Other computing-as-service platforms such as Force.com from Salesforce, Rackspace, or Heroku could be used, rather than implementing the location system 120 directly by the operator using physical computers or physical computers operating traditional virtual machines. Communications between the potentially geographically distributed computing and storage resources comprising the location system 120 are not shown.

The end points 130 are similarly coupled in communication to the location system 120 (indicated by double-headed line with arrows at end). This communication is generally over a network such as the internet, inclusive of the mobile internet, via protocols such as EDGE, 3G, LTE, WiFi, and WiMax. The end points 130 may communicate with the location system 120 using HTTP/HTTPS protocols and may be implemented in one embodiment using either a web interface or application to enable easy support of a range of device types as end points 130. The mobile 131 can be any mobile device, see definition supra, e.g. iPhone, Android phone, Windows phone, Blackberry. The tablet 134 is considered a mobile device, see definition supra, and could be a tablet computing device, e.g. iPad, iPod Touch, Android tablet, Blackberry tablet. Other types of mobile devices such as laptops are not shown, but could be used. According to some embodiments, the location software 159 is implemented on end points as an HTML, or web, application while in other embodiments, a custom, or native, user interface is prepared for the device. Similarly, some mobile devices support an "application store" concept and the location software 159 may be a download from the app store. In some embodiments, direct communication (not shown) between end points 130 and external sources 110 is performed. It bears emphasis that the discussed communications can be offline relative to the location determination process, thus making communication with a server resource optional during the processes described herein.

The display 160 is coupled in communication with the mobile 131, and the mobile 131 is capable of receiving user input 150, e.g. via keyboard, mouse, track-pad, touch gestures (optionally on display 160), camera and microphone, peripheral devices. The sensors 155 are coupled in communication with the mobile 131 (and generally integrated therewith). Similarly, the unregulated RF receiver 157 is coupled in communication with the mobile 131 (and generally integrated therewith). The location software 159 is stored on the mobile 131, e.g. in volatile and/or nonvolatile memory for execution by the processor(s) of the mobile 131.

The communication between the location system 120 and the end points 130 can be bidirectional with the end points 130 directly making requests to the location system 120 and the location system 120 directly making requests to the external sources 110.

Figure 2:
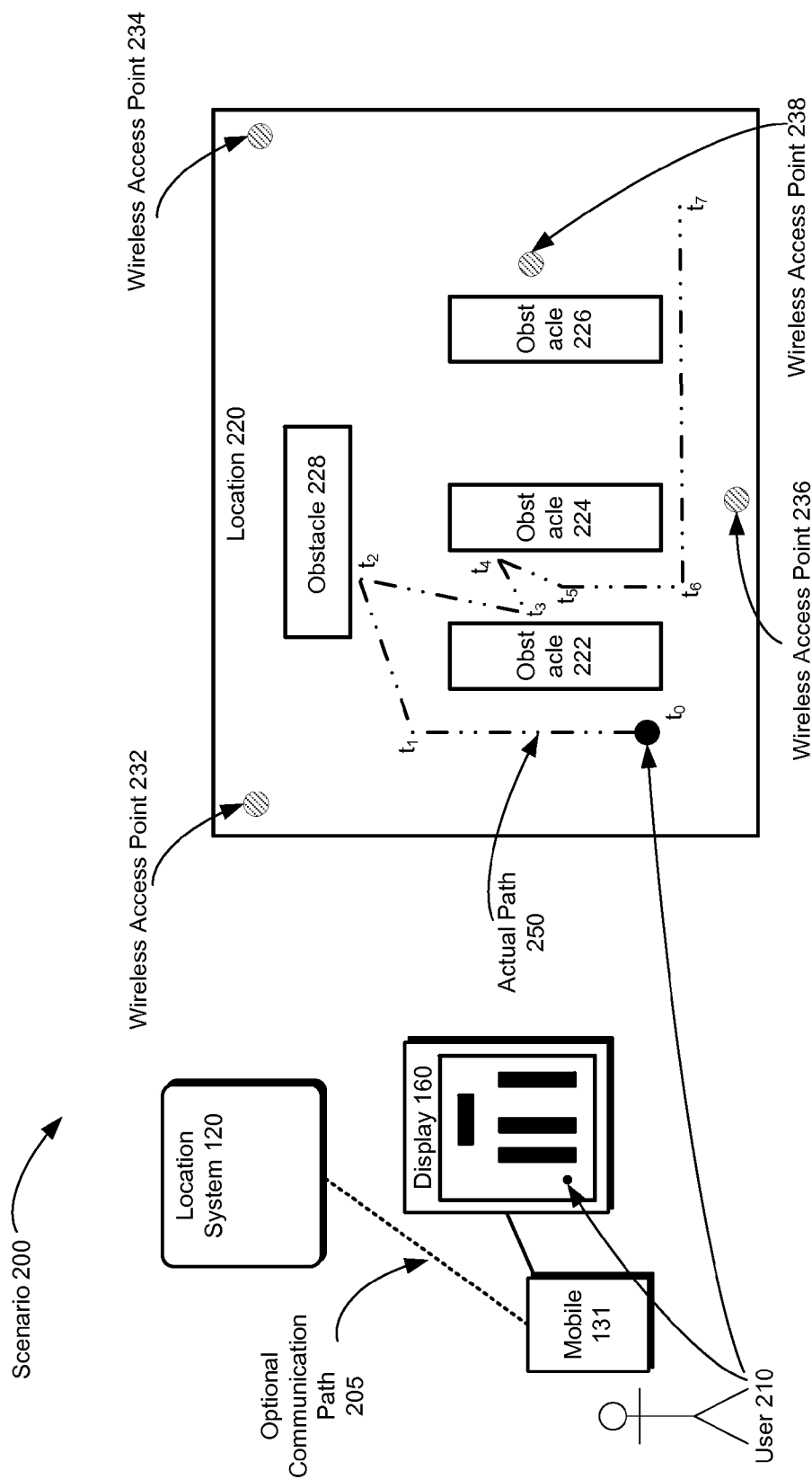
FIG. 2 shows an example of an embodiment of the location system in use on a mobile device.

Having described the elements of FIG. 1 and their interconnections, the system will be described in greater detail. This will be accomplished in conjunction with a discussion of FIG. 2 showing an embodiment of the location system in use on a mobile device in scenario 200. Specifically, scenario 200 shows a user 210 with mobile 131 navigating location 220. Scenario 200 highlights the optionality of communication between end points 130 and location system 120 by marking the communication path between the mobile 131 and the location system 120 as optional (optional communication path 205).

For discussion purposes, we will treat location 220 as a grocery store. In scenario 200, the location 220 has four wireless access points (wireless access point 232, wireless access point 234, wireless access point 236, wireless access point 238) that are unevenly distributed. The locations of the wireless access points within the grocery store are shown in the figure for discussion purposes, but notably need not be known to the mobile 131 or the location system 120, and could be either inside or outside the grocery store. Additionally, the wireless access points need not be within the grocery store, for example some or all of the access points could be in adjoining stores and those RF transmissions could be detected within the grocery store. The grocery store has several shelves and freezer cases (obstacle 222, obstacle 224, obstacle 226, and obstacle 228). Again, obstacle locations are shown in the figure for discussion purposes, but need not be known to the mobile 131 or the location system 120. Also, the actual path 250 that our user 210 will take in walking through the store is shown (dashed line with dots). The user's present position is shown as the solid dot at to. Several additional points on the user's path are marked as $t_1$, $t_2$, $t_3$, $t_4$, $t_5$, $t_6$, and $t_7$. These points have been selected for discussion and represent locations the user will visit during this visit to the grocery store on the user's actual path 250. Again, actual path 250 is not known to the mobile 131 or the location system 120, but rather the goal of the location software 159 and/or the location system 120 is to determine the user's location within the grocery store at any time. This, in turn, could be used to generate a calculated path (not shown) that will not precisely follow the actual path 250; however, using the approaches shown here, accuracy of approximately 1 meter is possible.

It bears emphasis that the location software 159 can be delivered as a library, software development kit (SDK) to application developers, or application programmer interface (API) to other software. The discussions herein will generally focus on embodiments where the location software 159 is a standalone application. However, it is expected that some embodiments have the functionality of the location software 159 encapsulated in other software, e.g. a Safeway application as opposed to a more general-purpose location software. Such embodiments may thus encapsulate some or all of the company info 112 directly in the application, e.g. store maps and directories may be pre-loaded in the Safeway application. Additionally, such applications may have greater contextual data available and/or offer customized features. In some embodiments, the correct contextual application, e.g. Safeway application, may be launched by the mobile device's operating system based on the general location and then the more detailed location capabilities of the system 100 become available within the specific application.

Lastly, FIG. 2 shows one possible display 160 on the mobile 131. This particular display shows the user's present position (solid dot) as well as the obstacles, for example if the location system 120 were able to obtain the indoor map from either map source 111 or company info 112. As noted, the location of obstacles is not required. However, easy integration with external sources of mapping data is a feature offered by some embodiments, and the display shown in FIG. 2 is a useful place to provide an example.

The basic operation of the location determination approach is as follows. The mobile 131 receives a signal indicating that the user wishes to know their location, e.g. precisely where they are. The mobile 131 can optionally communicate with the location system 120 for information. However, one feature of embodiments is minimal, or no, need for mobile-to-server communications. Specifically, one advantage is that embodiments allow full processing of the location computation to be done on the mobile 131. However, mobile-to-server communications allow for retrieval of useful information. Specifically, the primary server optional information can include: (i) maps, (ii) company-specific information (company info 112) and/or customizations, (iii) supplemental location information, (iv) prior visit data, and (v) other internet delivered information. More generally, the company info 112 includes contextual metadata about the venue and/or event.

Taking each type of optional data in turn, starting with maps, the simplest form of map would be a scale image of the grocery store, convention floor, outdoor concert venue, or the like. More advanced maps may include additional information such as the location of specific items/brands/merchandise on a dynamic basis. For discussing the system, maps are considered to be retrieved from map source 111 which can be multiple sources such as company websites, convention center websites, and the like. In some instances, entities may be provided a mechanism for interacting with the location system 120 (not shown) to manually and/or programmatically provide maps. For example, companies can be provided a mechanism to upload a file containing a list of all of their store locations, together with a URL for retrieving a map of the store. In such an example, the download sites for the maps would be the map source 111. For outdoor venues, simply knowing your location in the venue more precisely, as well as the location of your friend(s) in the venue, may be more than adequate without maps. Some embodiments support find-my-friend features and make use of mobile-to-server communications to enable that feature. However, for many indoor locations, maps can provide additional context for users to make use of the system.

The next category of optional server-provided information is company information (e.g. company info 112). As discussed, supra, this can take a number of forms, including customized and/or co-branded software to use for the location software 159. In other embodiments, the location software 159 can be customized on entry to a location, e.g. when you enter a Safeway, certain Safeway-specific customizations are loaded. The company info 112 could also be highly location specific, e.g. how freshly baked the bread you are standing near is, supplemental nutrition data for nearby products. The location system 120 obtains this information from the company info 112. Exemplary features may include the display of one or more customized buttons on the display in a context- and location-aware fashion. For example, if the user seems to be lost (repeatedly moving over the same area or in circles), then a "Need somebody to help button?" could appear and the user's location could be sent to someone at the store. Similarly, coupons and/or advertisements could be targeted based on where the user is standing. Other usage contexts may have other features, e.g. customized features for a convention might help you make a list of booths you want to visit, plan a route over the show floor, and automatically check off booths you stopped at for at least 30 seconds. In another embodiment, a record is maintained of booths visited and the time of the visit and this is made available to the user as an itinerary to enable the person to associate business cards, company website content, and more with the location data. This is an example list of supported features for some embodiments from the company info 112, but highlights the capability of the system.

Turning to the location info 113, one or more third-party databases such as Skyhook lists of WiFi hotspot locations, databases of cell tower locations, and operating system-provided location information can be used to improve (i) accuracy, (ii) the initial absolute location determination, (iii) time-to-fix upon a location, and (iv) outlier rejection. Returning to scenario 200, if this is the first time any user of the location system 120 has visited the location 220, it could be difficult to determine the user's starting position ($t_0$). This may be particularly true for indoor locations. As such, while the system will function and show a path without absolute positioning information, finding the right map and/or figuring out where the user started from poses a different set of problems, e.g. longer time-to-fix on a location, orientation determination, etc. In some instances, location information may be provided from context, e.g. user is using the Safeway application (e.g. as location software 159) thus more uniquely identifying her starting position. Thus, location info 113 offers a mechanism to make use of third-party data sources. In some embodiments, the mobile 131 may include features in the operating system that can similarly estimate a user's global position, and those features could be used instead of or in addition to the location info 113.

The final main category of optional server-provided information to the mobile is signal maps from prior visits to the location 220. Given the uniqueness of WiFi MAC identifiers, if the mobile 131 communicates the MAC identifier of hotspots near the mobile 131 to the location system 120, then signal map data from prior visits to the location 220 can be sent to the mobile 131 for use in location determination. The approach to building signal maps using prior run data will be described in connection with FIG. 4.

Returning to the basic process and the uses of the elements of FIG. 1, as the user 210 moves along actual path 250, the sensors 155 of the mobile 131 will record the movement, and the location software 159 will maintain a log of the sensor information, as well as the signal strengths on the unregulated RF receiver 157 and user inputs from user input 150. For example, if a certain bar code is regularly associated with a certain set of WiFi MAC addresses, that can assist in location determination and signal snapshot refinement. The collected information can then be used to determine the user's location as will be described in greater detail in connection with FIG. 3.

In summary, the architecture of system 100 and the components and mechanisms through which it affords improved mobile location determination have been described. Benefits of the described embodiments include: minimal to no reliance on GPS (high power, poor quality indoors, and insufficient accuracy); computations can be performed solely on the mobile device; mobile device-server communications minimized (so millions of devices can be handled with relative ease) and optional; no prior knowledge of locations required (easy adaptation to changes in the location such as rearrangements (of access points and floor layout/obstacles); low cost for a company to include their locations because no costly pre-mapping is required); capable of high accuracy (positioning accuracy of 1-3 m which then supports greater targeting of information and offers); and personalized to the user (information from social network(s) can be incorporated) with direct feedback on location and information available.

Expanding on each of these points briefly, starting with minimal to no reliance on GPS. GPS requires relatively high power consumption for a mobile device and for indoor uses, is particularly poor quality. Additionally, the accuracy provided by GPS is insufficient for the level of granularity sought, 1-3 m location accuracy. Some embodiments make minimal use of GPS to make an initial absolute location determination and, optionally, as part of a query to obtain information from sources over a network. Computations can be performed solely on the mobile device, thus reducing mobile device-to-server communications. As noted previously this allows the server, e.g. location system 120, to easily scale and efficiently handle huge numbers of users at a time.

Many existing location systems, especially those making use of WiFi require detailed prior knowledge of locations. For example, without a floorplan for a store, the prior systems may not work. Similarly, prior system that are not pre-provided information about the WiFi hotspots as measured by special measurement equipment may not work. Since floor layouts and WiFi transmission patterns change regularly, this approach can be extremely costly for businesses that want to provide advanced location-based functionality within their establishments. Additionally, wrong data about locations of WiFi access point placements are often provided. Highly inter-related is the capability for embodiments to offer high accuracy, 1-3 m, which in turn allows for support of a variety of functionality for both businesses and users.

Additional aspects of the system will be described in greater detail with reference to the scenario 200 and process flow diagrams in the subsequent figures.

Positioning

Figure 3:
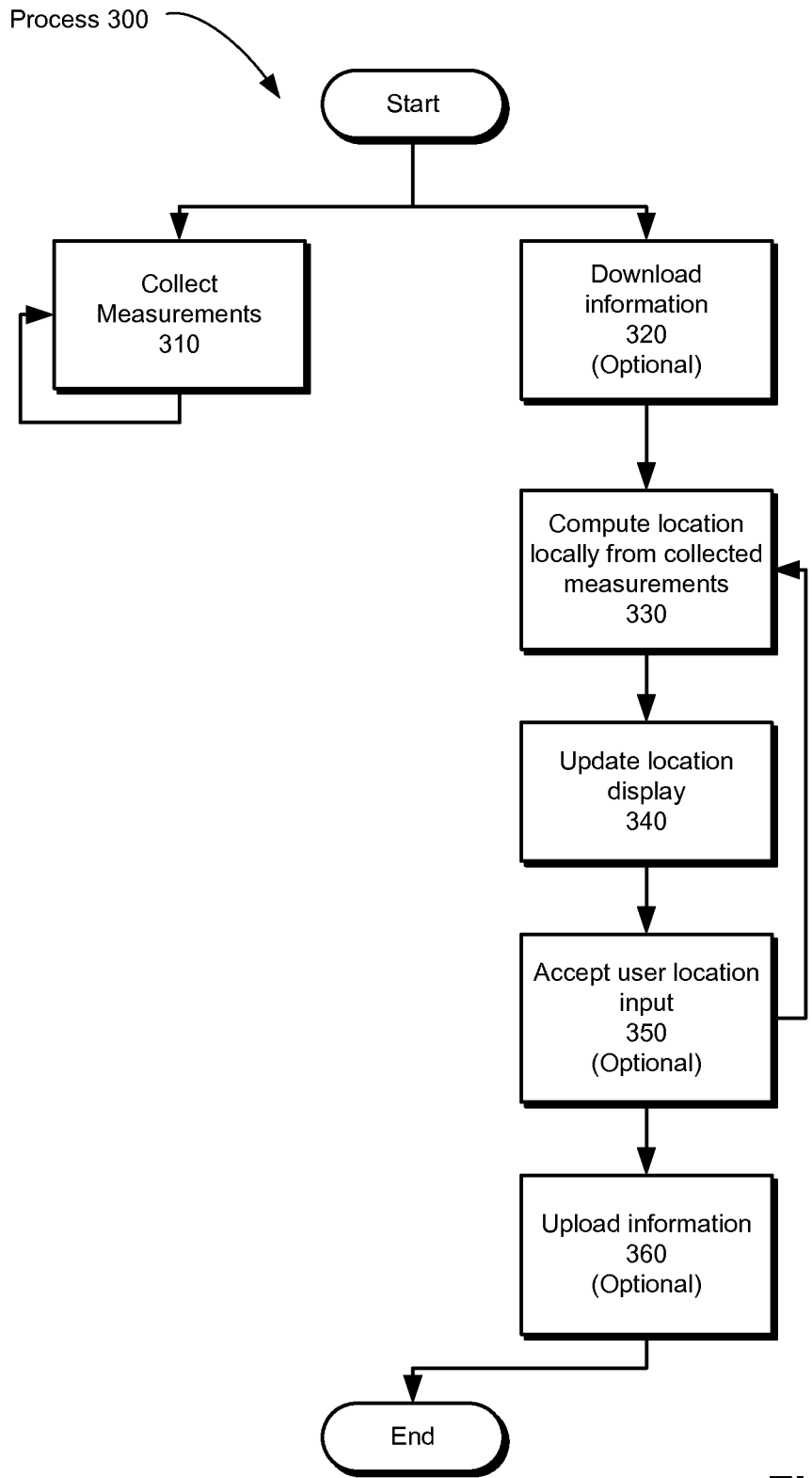
FIG. 3 is a process flow diagram for the location determination process according to one embodiment.

FIG. 3 is a process flow diagram for the location determination process according to one embodiment. In this embodiment the processing may occur solely on the mobile device, e.g. mobile 131, though points where optional communication with the location system 120 can be used will be discussed. In this embodiment, the process is primarily performed by location software 159.

FIG. 3 includes process 300 which has two primary flows shown separately to emphasize their independence and parallelism. The first flow is step 310, collect measurements (used at step 330). A loop emphasizes the continual iteration of this process. In one embodiment, this step occurs multiple times per second. For example in one embodiment, the location determination (step 330), discussed infra, occurs every 0.05 seconds, as such measurement collection will generally be more frequent, though different sensors will have different collection rates. The specific measurements collected will vary based on the available sensors 155, user input 150 and receiver 157 on the mobile 131. Additionally, in some embodiments, step 310 may involve the software registering with the operating system to receive messages with measurement info already being collected by the system. In other embodiments, some measurements must be taken directly, and the software may need to run in the background and/or periodically poll for information. In one embodiment, step 310 includes logging information from sensors 155 in a log file with a timestamp, together with information from receiver 157 (e.g. signal strength of transmitters in range together with identifiers), and selected user inputs 150. The information logged will be described in greater detail below in connection with step 330. Also, while this discussion covers an embodiment using a text file to store the data, other data storage approaches are used by other embodiments, e.g. structured databases, key-value stores, etc. The term log or log file as used herein is used in the sense of referring to information linked to a timestamp, as opposed to a specific format such as a text log file, string formats, data structures and/or databases. The term data structure as used herein refers to a way of storing and organizing data in a computer system and should be understood to encompass objects and/or object oriented approaches. Additionally, some data structures may be stored or represented in databases.

The other flow of process 300 is the main location determination flow. This starts at step 320 with the optional download of information from the location system 120. As discussed, supra, this can include obtaining maps, company information, location information, and/or prior signal maps for the location. This step may include transmitting some information from the measurements (step 310). For example, the MAC identifiers for WiFi base stations sited by the mobile device in the last few readings could be transmitted to the location system 120. The location system 120 could then provide signal maps from other users or other information about the location.

The process continues at step 330 with location computation from the collected measurements. Once the location is computed, it can be updated and displayed at step 340 to the user, e.g. the user 210 on display 160 of mobile 131. Process 300 reflects a process for interactive location map/path display, thus step 340 is described as regularly occurring. In some embodiments, the user's location is not continually displayed, but rather only selectively displayed and/or displayed in the context of visited/unvisited areas. For example, in a museum, you might show unvisited vs. visited exhibits. At step 350, optional user location input is possible; this may be particularly valuable for initial location determination and/or helping the system fine-tune the location. As discussed, some user input may be in the form of video and/or audio. For example, a bar code decoded from the camera may be helpful in fine-tuning the location and thus the signal map. This may be particularly true in company-specific application, e.g. Safeway app and user is scanning a frozen food item that is normally stored on aisle 7 of Safeway 123. Additionally, an explicit loop is shown here back to step 330 to emphasize the ongoing nature of the process 300.

Separately, the upload of signal map information (e.g. log data from step 310) from the mobile 131 to the location system 120 is shown as outside the main loop at step 360, which is optional. Step 360 could occur at other times, e.g. every X seconds/minutes/hours; as part of the step 310; in a location-aware fashion, e.g. when a user leaves a location, the logs for that location are sent; based on bandwidth between the end points 130 and the location system 120; as part of a reward/game mechanic to encourage visits to and collection of signal snapshots from a variety of location. Other embodiments may use additional location-aware triggers for step 360, e.g. places with fewer existing signal snapshots may trigger step 360 more often then heavily visited locations, or places where greater precision is needed.

The process used by some embodiments at step 330 will now be discussed in greater detail. A Python-style pseudo-code format will be used to discuss the process; however, other implementations are possible. There are two primary concepts for which processes will be presented: (i) assessing how good a guess of a location is as a match to the prior path model and the collected measurements; and (ii) how to make good guesses about the current location.

Fit Functions

Turning to the first issue, consider a simple example, accelerometer input only (so just relative movement information—no absolute position information). So, the user is walking with a mobile device, and there is a raw_log_file available as a data structure with timestamped accelerometer data. This function assigns a fit value to a proposed position that the user walked in a path_history data structure with locations every 0.05 seconds in one embodiment. The 0.05 seconds is not linked to the raw_log_file frequency per se, but rather to the rate selected for the path determination updates.

```
def fit_function(path_history,
    raw_log_file):
        total_fit = 1.0 # start with 100% fit
        for each u in path_history:
            total_fit *=
    fit_function_accelerometer(u, raw_log_file)
        return total_fit
```

To avoid multiplication in the computation, addition and logarithms can be used instead, thus speeding up computations and avoiding the possibility of overflow. So, consider how the fit of the accelerometer can be computed. The following conventions are used: u corresponds to a moment in time, u.location( ) is the specific x, y, z for that time, and u.t( ) is the timestamp. Similarly, p is the previous guess to u in the path_history and, in this embodiment, would be exactly 0.05 seconds prior in time; however, the more generic equation is shown.

```
def fit_function_accelerometer(u,
    raw_log_file):
        distance = distance(u.location,
    p.location)
        accelerometer_readings =
    raw_log_file.get_accel_readings(u.t( ) – 0.2), u.t( ))
        if at_rest(accelerometer_readings)
            return StandardGaussian(distance,
    sigma_squared=0.01)
        else:
            regular_walking_speed = 1.22
    meters per second
            regular_walking_distance =
    regular_walking_speed * (u.t( ) – p.t( ))
            return Laplace(distance –
    regular_walking_distance, scale = 0.44)
```

The constants used above are exemplary only, e.g. 1.22 meters per second, looking at the recent 0.2 seconds of accelerometer readings, using 0.01 in the Gaussian, and scaling the Laplace by 0.44. However, the values chosen correspond to prior research on walking paces. Other embodiments can use a more dynamic approach by counting the number/frequency of impulses like a pedometer. Similarly, the use of Gaussian and Laplace functions is not required; other functions could be used instead. These numbers should work well for common use cases of phone in pocket, phone swinging in hand, phone in front of user being looked at. The test for at_rest is straightforward:

```
def at_rest (accelerometer_readings):
    # input is a time series of
    accelerometer measurements
        return false if there are oscillations
    in the readings
        return true otherwise
```

At this point, using the accelerometer only, an approach to determining whether a guess is a good fit or a bad fit for where the user's path has been presented. Returning to FIG. 2, if the user was at the location indicated by $t_3$ and the recent accelerometer data reflected the distance between $t_2$ to $t_3$, a guess of the location at $t_7$ should be a worse fit for the accelerometer readings than a guess of the location at $t_5$. Before discussing the process for making guesses, we will discuss adding WiFi to the mix as an example of one unregulated RF signal to incorporate.

A signal_snapshot is a data structure that maps information about received WiFi transmitters in a physical vicinity. In one embodiment the map is divided into a two-meter (2 m) square grid—often referred to as cells—with the following for each transmitted in the map grip: the mean, the variance and the number of samples. More generally embodiments will either (a) maintain past measurements directly, e.g. list, or (b) maintain a set of sufficient statistics. The use of mean, variance, and number of samples is data compact and efficient to update with new data.

The fit_function can be modified to include the signal_snapshot and an adjustment based on WiFi:

total_fit*=fit_function_wifi($u$,raw_log_file,signal_snapshot)

Again, logarithms and addition can be used to avoid multiplication. Also, weightings can be applied if one sensor is more accurate than another. Alternatively, dynamic weightings can be applied, for example when at_rest==true the accelerometer could be emphasized because the WiFi readings will be more redundant as they are from the same location. The fit_function_wifi could be implemented as:

```
def fit_function_wifi(u, raw_log_file,
signal_snapshot):
    raw_wifi_readings =
raw_log_file.get_wifi_readings(u.t( ))
    radio_map_cell =
signal_snapshot.get_nearest_radio_map_cell(u.location( ))
    total_fit = 1.0
    for each mac_address in
raw_wifi_readings:
        expected_wifi =
radio_map_cell[mac_address]
        measured_signal_strength =
raw_wifi_readings[mac_address]
        total_fit *=
Rayleigh(measured_signal_strength,
expected_wifi.parameters)
    return total_fit
```

This example does not include adjustments for gain factors such as transient environment effects, orientation of mobile device/antenna, crowded/empty room, antenna properties specific to mobile device model, or hand position over antennas. The gain factor could be guessed and incorporated as an adjustment to the inputs to the Rayleigh calculation, e.g. adjustments to measured_signal_strength or expected_wifi.parameters. Also, to handle cases where the current signal_snapshot does not have a map for the current cell, get_nearest_radio_map_cell could return the adjacent neighboring cells, and then expected_wifi.parameters could return the bilinear interpolation between those neighbors. Other interpolation approaches are possible too, e.g. eight neighbors, quadratic interpolation. Also, use of the Rayleigh distribution in volts is not required, but provides advantages. Other choices selected by some embodiment include: use of empirical log-distance path loss model, use of the Gaussian distribution in dBm, Nakagami-Ricean in volts, Loo's distribution (for shadow and multipath).

Intuitively, each grid (or cell/square) of the signal_snapshot describes the distribution of possible WiFi signal strengths for each transmitter "visible" at the cell's location. Returning to FIG. 2 and scenario 200, when the user is standing at $t_3$, the signal strengths for the wireless access points 232-238 should look quite different than when the user is at $t_7$. Also, other unregulated RF transmissions could be mapped, e.g. RFID, NFC, Bluetooth. In an alternative embodiment, regulated signals such as cellular signals and broadcast TV/radio can be used too; however, in some embodiments, the broadcast TV/radio may have too little variance over small distances to provide useful location determination at a fine level. What is important, in some embodiments, is that the reference signal has variation in signal strength over a short distance and the source can be identified. Nonetheless regulated signals like TV/radio can help with coarse location identification and may also be helpful for: distinguishing between floors of a building, distinguishing between two different rooms (as opposed to position within the room), time-to-fix, outlier rejection, and as an alternative to GPS.

A few more functions should be discussed before turning to how location guesses are made. Specifically, removing the assumption in the prior fit_function example that the signal_snapshot was known, and also providing some additional exemplary sensor fit functions used by some embodiments:

```
def fit_function(path_history,
raw_log_file):
    signal_snapshot =
new_empty_signal_snapshot( )
    total_fit = 1.0
    for each u in path_history:
        total_fit *= fit_function
accelerometer(u, raw_log_file)
        total_fit *= fit_function_wifi(u,
raw_log_file, signal_snapshot)
        signal_snapshot.append(u,
raw_log_file)
    return total_fit
```

Concepts from Bayesian filters are used to determine the contents of the signal_snapshot. Specifically, each grid (or cell) of the map only needs to store the mean and variance (or store sums and sums of squares for later division by the number of samples) for past WiFi observations at that location. This permits signal_snapshot.append( ) to just update the map with the latest observations:

```
def signal_snapshot.append(u, raw_log_file):
    raw_wifi_readings =
raw_log_file.get_wifi_readingds(u.t( ))
    radio_map_cell =
signal_snapshot.get_nearest_radio_map_cell(u.location( ))
    # note in this embodiment path_history
is 0.05 seconds apart, but wifi scans only occur every 1.5
seconds
    if there exists wifi scan between u.t( )
and prior guess:
        # add this new scan, note could
store a list of readings instead
        for each mac_address:
            radio_map_cell[mac_address].sum1 +=
raw_wifi_readings[mac_address] ** 1
            radio_map_cell[mac_address].sum2 +=
raw_wifi_readings[mac_address] ** 2
            radio_map_cell[mac_address].N
+= 1
```

So the mean and variance as well as number of observations of the signal strength of each mac_address stored by the system for the given location. In one embodiment, the append function is modified to maintain the sums in two units: volts and dBm. Volts are useful for location computations in areas with multipath fading, while dBm are useful for location computations with shadow fading. Some embodiments may use more complex adjustments to neighboring snapshot grid cells. For example, each scan could contribute a fraction of the observation to neighbors with bilinear weighting and fractional values for N.

Some additional fit functions will now be discussed that could be added to the main fit_function depending on the sensors available.

Gain factor measures antenna gain, e.g. of the WiFi or cellular antenna. Gain can vary strongly based on how many people are in the room, how you hold the mobile device and the like. One embodiment sets a maximum gain factor, e.g. 0.02 dB as a flat cutoff, e.g. if abs(p.gain( )−u.gain( ) then a fit of 0 is returned and if it is within the cutoff a 1 is returned. Thus, new guesses should show relatively slow gain. Other return values for a fit_function_gain_factor could be Gaussian(p.gain( )−u.gain( ), sigma=0.003) which provides a smoother score.

Many mobile devices include a compass or other composite heading estimator that can provide a heading. We can use this sensor to favor guesses of locations that indicate movement in a continued direction:

```
def fit_function_heading(u, raw_log_file):
    guessed_heading = (p.heading( ) +
u.heading( ))/2.0
        t_midpoint = (p.t( )+u.t( ))/2.0
        measured_heading =
raw_log_file.get_heading_reading(t_midpoint)
        return
Gaussian(angle_between(guessed_heading, measured_heading)
```

In the heading estimation alternatives used by some embodiments to the Gaussian include rectangular or triangular kernels. The gyroscope of a mobile device can be similarly used (where q=the path history entry prior to p):

```
def fit_function_gyroscope(u, raw_log_file):
        initial_heading = direction vector from
q.location( ) to p.location( )
        final_heading = direction vector from
p.location to u.location( )
        timespan = u.t( ) − q.t( )
        guessed_rotation = angle between
initial/final headings
        measured_rotation =
row_log_file.get_gyroscope_readings(q.t( ), u.t( ))
        return Gaussian(guessed_rotation −
measured_rotation, sigma_squared = timespan)
```

Some embodiments of the gyroscope may employ a guessed bias to the gyroscope to allow the search function (to be described infra) to search for the optimal value. A similar approach together with a guessed bias could similarly be applied to compass data.

The magnetometer (different from the compass), which can be sensitive to indoor features, can also be especially useful without a gyroscope. The magnetometer may also be a particularly good movement/at rest discriminator function. The following is one embodiment; other embodiments are implemented more similarly to the gyroscope function:

```
def fit_function_magnetometer(u,
    raw_log_file):
        rotation = angle between p.heading( )
    and u.heading( )
        magnetometer_readings =
raw_log_file.get_mag_readings(p.t( ), u.t( ))
        if magnetometer_readings
```

```
steady/unchanging:
            return
StandardGaussian(rotation, sigma_squared=0.001 radians)
        else
            return 1.0
```

Conceptually, in the steady state if you are not turning, the "fit" is best if you are moving straight. If it is changing, you could be walking, rotating the phone or the like, so a fit of 1 is returned to leave the rotation unconstrained. Note however, that phone movements can be de-correlated from body movements. For example, the user can rotate their phone without moving their body.

GPS fit functions can be Gaussian (gps_location at u.t( ), gps_confidence_interval at u.t( )). Other time-ranging signals such as infrared, time-difference-of-arrival estimates from advanced WiFi systems, and time-of-flight measurement systems could be incorporated similarly.

Occupancy, meaning whether a space is walkable or not, can be particularly useful. In some embodiments, occupancy information is exchanged implicitly via the signal_snapshot. Specifically, each grid of the signal_snapshot could be ascribed an occupancy value from 0 to 100%, starting at 50%. As log data is collected, the signal snapshot begins to reflect which areas are walkable vs. not and the occupancy value could be adjusted. In a similar fashion, old paths identify dead space as well. In one embodiment, occupancy maps can be generated from old paths computed using raw_log_files for a location. The occupancy maps can be downloaded at step 320. In still other embodiments, foot traffic maps can be maintained identifying more commonly walked areas in a similar fashion.

Bluetooth and other short distance wireless technologies such as NFC/RFID, Zigbee, cross-phone WiFi detection can be used in the following basic approach (also, the shown Bluetooth process uses additional communication with the location system 120, or directly between mobile devices on a peer-to-peer basis for the computation):

```
def fit_function_bluetooth(u1, u2,
    raw_log_file1, raw_log_file2):
        visible_bluetooth_devices1 =
raw_logfile1.get_bluetooth_detects(u1.t( ))
        visible_bluetooth_devices2 =
raw_logfile1.get_bluetooth_detects(u2.t( ))
        if user1 in user2's visible list and
    user2 in user1's visible list then:
            # the users are close to each
    other
            return Gaussian(distance between
u1.location( ) and u2.location( ), sigma=3.5 meters)
        else:
            return 1.0 − Gaussian(distance
between u1.location( ) and u2.location( ), sigma=3.5 meters)
```

Some embodiments use values other than 3.5 meters and/or the Bluetooth signal strength to estimate the distance between users.

The fit functions used at step 330 have been discussed, along with the process for creating signal snapshots of unregulated RF transmissions such as WiFi which can be used to evaluate the variety of sensors on a mobile device for use in location determination. The next section will discuss the search approach for using the fit information to determine a user's location.

Search Functions

The search process is focused on finding the best-fitting path_history given the selected fit function in linear time. The proposed approach ultimately uses sequential importance resampling. Because the fit function is designed for sequential computation, e.g. for a "guess" along a path_history, the total_fit is accumulated incrementally and in chronological order. This allows for a path_history to be iteratively generated by making one guess at a time in chronological order. Then, at each step, just the incremental fitness score needs to be compared and the top few selected. This results in a greedy search process:

```
def search_simple(raw_log_file,
signal_snapshot):
    hypothesis[0...499] = all empty path
histories # make 500 empty path_histories
    for t = earliest timestamp to last
timestamp in 0.05s increments
        weights[0...499] = all 1.0 # 500 total
fit values
        for i = 0 to 499:
            next_guess = make a guess for
timestamp t in a uniformly random fashion
            hypothesis[i].append(next_guess)
            w = run one iteration of
fit_function( ) to get incremental fitness
            weights[i] *= w
        resample hypothesis by weights
```

Improvements in this approach, thus, will come from choosing proposal distributions for the random guesses. One approach is to focus on areas of higher likelihood as opposed to completely random locations, so the code above in the inner loop could become next_guess=sample from Gaussian (hypothesis[i].prev_guess.location( ), sigma=5 m) and weights[i]*=w/Prob$_{sample}$ (next_guess).

In other instances you can avoid computing the fit function of a sensor (e.g., accelerometer), by sampling from an equivalent distribution. For example, using the accelerometer, if at_rest==true, then given the prior fit function, it would match a Gaussian (distance, sigma_squared=0.01). Rather than sample a guess and then evaluate the fit, the next guess can be directly selected from the distribution, Gaussian (distance, sigma_squared=0.01). One way to implement this is to generate a random Gaussian distance according to sigma_squared=0.01, and set your next guess to be that distance from prev_guess. When sampling from the distribution equivalent to your fit function, additional simplifications can be made because w==Prob$_{sample}$ (next guess); thus eliminating the need to update weights[i]*=w/Prob$_{sample}$ (next_guess).

The simple_search( ) is deceptively simple; it allows step 330 to quickly test several hundred (intelligent) guesses at a time to generate a path_history iteratively from the raw_log_files and signal_snapshot and then display the current location to the user at step 340. The number of test hypotheses, 500, was selected based on processing power in today's mobile devices to balance computation time, power usage, accuracy, and responsiveness. The specific number of hypotheses to test on future devices may be greater or fewer. For example, greater computational power in future devices may permit more complex analysis of fewer guesses while providing better results. Similarly, the chosen sampling intervals of 0.05 seconds to update the path and 1.5 seconds to scan for updated WiFi (or other unregulated RF transmissions/transmitters) are grounded in the same tradeoffs and could likewise be adjusted.

Further Improving Signal Maps

Further optimizations and improvements to the signal snapshot are possible and are used according to some embodiments. First, consider the handling of limited observation data, e.g. first visit to location 220 of FIG. 2 and there is minimal data in the signal_snapshot. In this situation, as the user begins walking down the actual path 250, the signal_snapshot will begin accumulating data, but many grid cells are empty and N==0.

One approach is to compute estimated means and estimated variances for empty cells. This is done as follows in one embodiment. First, a global_prior is computed (or obtained, e.g. from the location system 120). The global prior can be computed as the global mean and variance of all dBm values in all raw_log_files available. The radio_map_cell[mac_address] parameters for empty cells can be initialized to this global_prior. The selection of which log files to use is implementation-specific; some embodiments use all available log files, while other embodiments may use a subset of available log files, e.g. filtered for that user, that mobile device, that general location. Instead of the global_prior, actual observations from one cell can be used in neighboring cells as data becomes available. Adjusting the mean and variance for those cells is a type of interpolation based on nearby neighbors. One embodiment limits the propagation of observations to a maximum distance, e.g. 5 meters. Also, some embodiments make use of a counterintuitive decay function denominated in units of 1/volts as opposed to a linear decay in dBm. Other sufficient statistical methods could be used, e.g. medians, square root of the means squared.

The reason for the choice of units is an assumption that locally, signal strengths obey the log-distance path loss model. Interpolation is then an averaging function in units of Watts** ($-1.0/\gamma$), where $\gamma$ is the wireless path loss exponent. For areas with free space in the vicinity, $\gamma=2.0$ can be used. If the signal_snapshot is maintained in units of volts, then converting the mean and variance to 1/volts for computation, and then back is simple.

Additionally, some embodiments assign an $\alpha$-value to each cell in the signal_snapshot. The $\alpha$-value for observed cells is 1.0 and the $\alpha$-value for "empty" cells more than 3 cells away from the nearest observation is 0.0. Cells near an observed cell have an $\alpha$-value that is higher for cells closer to observation. A cell with an $\alpha$-value of 0.7 would take on its interpolated signal strength with only 70% weight. The remaining weight could be selected from the set of a uniform prior, the global_prior, a generic distribution, a heuristic based on the distance from the access point, a heuristic based on the log-distance path loss model. The fall off of a based on distance from observation can be implemented as a window function, e.g. quadratic window (Epanechnikov), triangular window, constant/rectangular window.

In the discussion thus far, the cell shape in the signal_snapshot has been assumed to be a uniform grid of squares. However, other cell shapes are used by other embodiments including: log-polar cells, centered around where the signal strengths are strongest; log-polar cells, centered around where the signal strengths have the largest gradients; square cells, but unequally sized. For example, to implement uneven square cells some embodiments start with a single-cell grid that is divided into smaller cells as sufficient WiFi observations are received, e.g. ensure every cell has at least N observations.

Further Improving Future Searches

We have now discussed the fit functions, search strategy, and signal map improvements used by some embodiments.

Another technique used by some embodiments is to optimize and search across a larger collection of log files to build better snapshots. In discussing FIG. 3, we covered the optional steps (step 320 and step 360) where data is transferred from the mobile device to the location system 120 and back.

Figure 4:
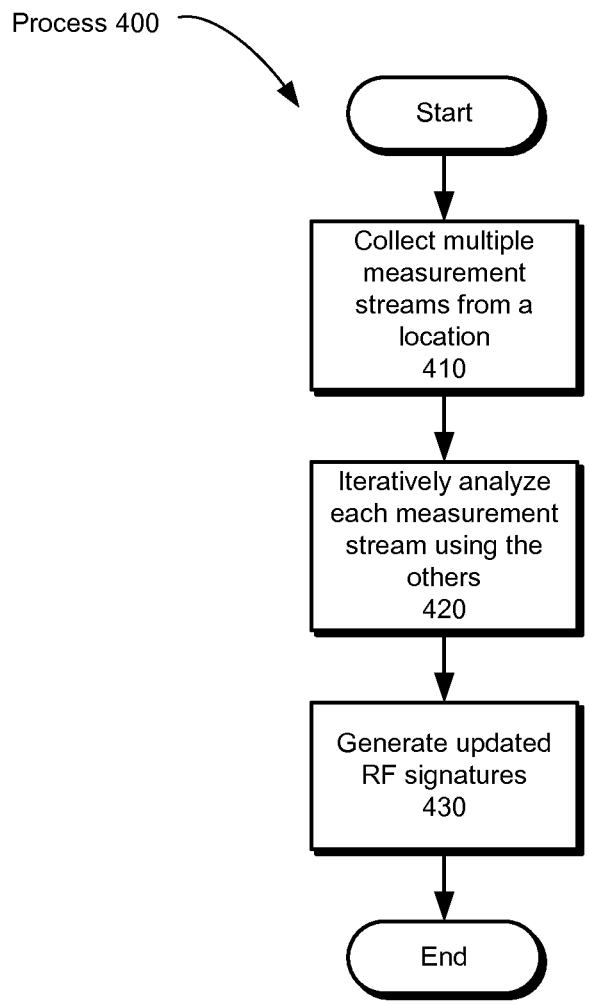
FIG. 4 is a process flow diagram for refinement of the location determination process according to one embodiment.

As noted, one of the transfers down to the mobile device 131 could be a signal_snapshot and one of the transfers up to the location system 120 could be a raw_log_file. One optimization technique will be discussed in conjunction with FIG. 4, which is a diagram for refinement of the location determination process according to one embodiment. Additionally, FIG. 4 will be described in the context of a client-server type usage with processing from multiple devices occurring on the server, e.g. location system 120. In some embodiments, the process of FIG. 4 is performed on the mobile device using multiple log files from that device and/or additional log files received from other mobile devices. In such an embodiment, the process of FIG. 4 could be performed by the location software 159.

Returning to the signal_snapshot data structure discussed supra, the append function was described according to an embodiment that permits easy crowdsourcing, self-healing (response to changes in the signal_snapshot), and real-time localization. Some embodiments may perform some or a portion of these functions on the location system 120 to reduce processing burden, network bandwidth, and response time on the mobile device. Additionally, in addition to providing for better location determinations for users, processing this information on the server can also provide a company analytics. Specifically, by aggregating raw_log_files from multiple visits (different users, different devices), a joint guess across a larger database of readings is possible. Specifically, if all raw_log_files are placed in chronological order; a fit_function is computed for each guess in chronological order; during the iterations of fit_function, the system continues to accumulate the signal_snapshot; and continues using the up-to-date accumulated signal_snapshot for future iterations. For implementation, some embodiments upload raw_log_files at step 360 and download signal_snapshots at step 320.

FIG. 4 includes a process 400 that starts at step 410 with collecting measurement streams, e.g. raw_log_files, from a location. For example, if multiple mobile devices (and their users) visit location 220, then there might be many raw_log_files available. Some of those measurement streams may be from a single user/mobile device. For example, in the grocery store example, if the user 210 is an employee, she/he may account for the bulk of the available measurement streams. Process 400 continues at step 420 with analysis of the measurement stream using the others, described in greater detail infra. In one embodiment, step 420 is accomplished through the application of stochastic coordinate ascent to the raw_log_files. This can be considered an application of self-guided machine learning. The result of step 420 is an updated signal_snapshot that is generated at step 430.

Turning to the details of step 420, a variation on the previously described simple_search( ) approach can be used to build a better signal_snapshot. At step 420, the simple_search( ) described above can be run on each raw_data_log in chronological order. Other orders are possible, e.g. most recent runs first, longest-duration runs first, most reliable contributors (e.g. based on past history), runs with the most user interaction first, and the like.

At the end of this initialization, one path for each raw_log_file will have the highest weight for that run of simple_search( ), e.g. best_hypothesis_so_far[logfileID]. Then, iterative improvement of each "dimension" can occur. In this example, database refers to the collection of log files in use:

```
def optimize(best_hypothesis_so_far,
database):
        for each i in dimensions:
            signal_snapshot.append(best_hypothesis_so_far[1..
(i-1)])
                best_hypothesis_so_far[i] =
        search_simple(database[i], signal_snapshot)
```

The order in which the loop is performed is implementation-specific, e.g. reverse/forward chronological order, random. As shown, all previously explored dimensions up to i are used to build the signal_snapshot for re-running the simple_search( ). While the code above appends signal snapshots 1 . . . i−1, more generally it could be all except i when performing coordinate ascent. Also note that if performed on a server, more complex computations and/or a greater search space, e.g. more than 500, could be used compared with when the simple_search( ) is performed on a mobile device.

Further improvements, including applying outlier rejection techniques, to the data. Groups of outliers that are self-consistent are likely different floors of a building and can be separated into a separate signal_snapshot and/or collection of log files as appropriate. This capability provides for improved handling of multi-story indoor environments in some embodiments. Stand alone outliers may include moved/removed transmitters which could be removed from the data and/or that entire log file could be removed from consideration. For example, if discrete changes in the WiFi environment have occurred the system would detect that after a certain point in time logs will be consistently lower likelihood and degenerate versus prior to that point in time.

Because WiFi environments are unregulated, or ad hoc, they tend to change regularly. For this reason, it may be desirable to dispose of old log files after a period of time, e.g. 3-6 months. In some embodiments, older log files in locations that have a larger quantity of newer log files are disposed of sooner than locations with fewer log files. Thus, for example, if location 220 of FIG. 2 is a heavily visited grocery store with dozens of log files generated each day, the value of a three-plus month old file is lower than for a location where there is only one visit every few months where it may be useful to save the log files for a longer period.

Examples and Further Discussion

Figure 5:
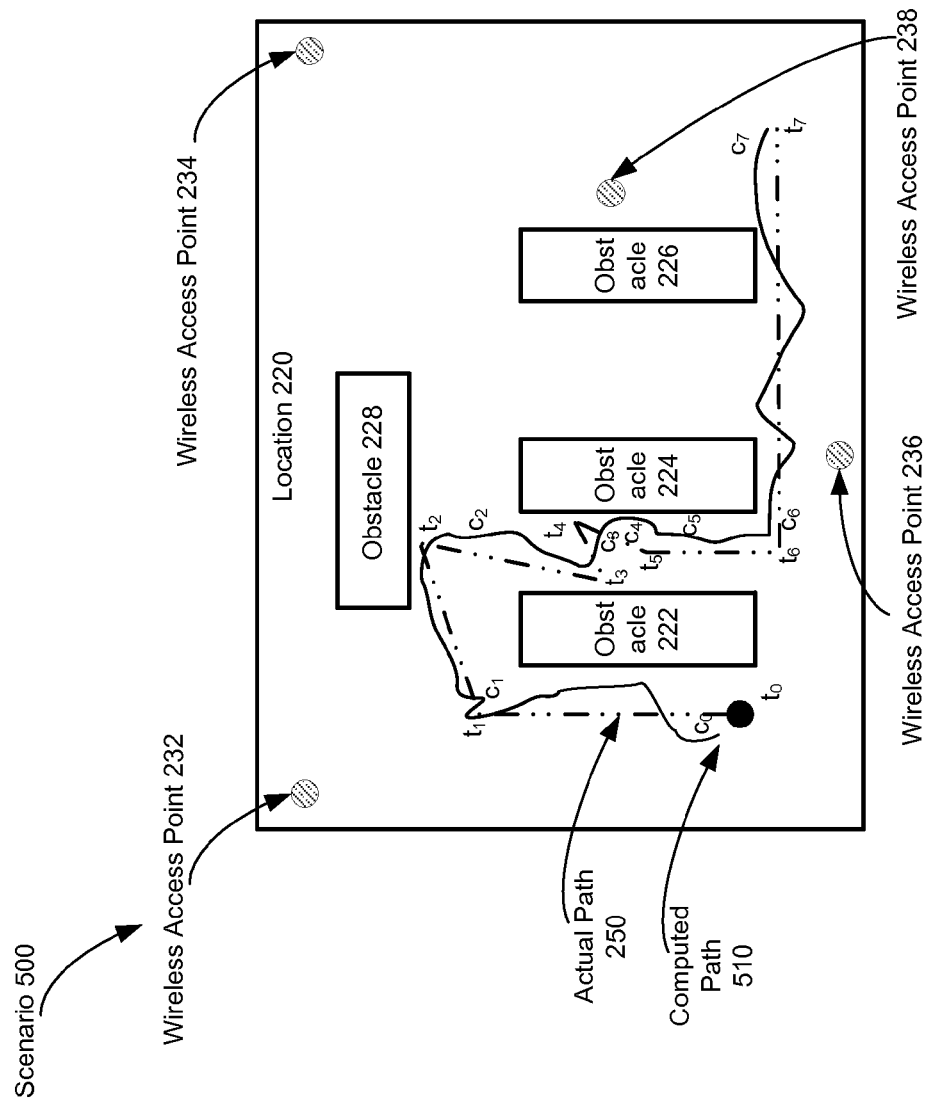
FIGS. 5-6 show example results from embodiments of the location determination process.
Figure 6:
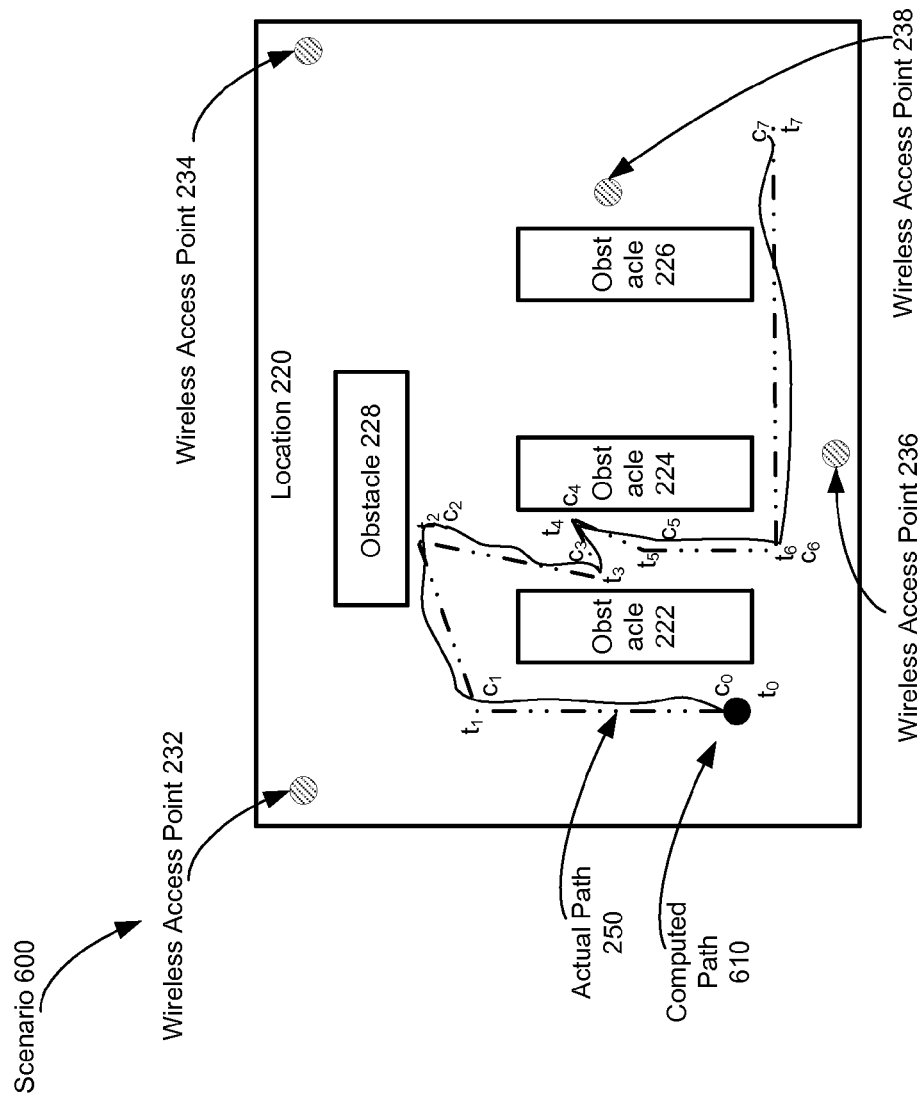

The processes of FIGS. 3-4 that were described, supra, will be illustrated in the context of the example of scenario 200 of FIG. 2 as well as FIGS. 5-6 which show example results from embodiments of the location determination process in variation of scenario 200. Specifically, FIG. 5 shows scenario 500 which is the same as FIG. 2 with the user 210, mobile 131 and related elements removed and a computed path 510 shown. FIG. 6 similarly shows scenario 600 which like FIG. 5 omits elements of FIG. 2 and shows an alternate computed path 610. On FIGS. 5-6 the computed paths have been annotated with $c_0$-to-$c_7$ showing the computed location at the respective $t_0$-to-$t_7$.

In this discussion, the location 220 is a grocery store and the obstacles 222-228 are aisles and shelves of the store. In this discussion, the location system 120 has provided the mobile 131 a scale, or roughly-to-scale, map of the store, e.g. at step 320 of process 300, e.g. from company info 112 or a public website, e.g. a crowd sourced map website. In discussing FIG. 5, we will assume that there was no signal snapshot available on the location system 120 and the mobile 131 and this is the first visit to the location 220.

The mobile 131 will be creating and then updating a signal snapshot (e.g. signal_snapshot data structure) every 1.5 seconds and an accelerometer on the mobile 131 will be used. In this example, the mobile 131 can at step 330 initially start collecting measurements and may prompt the user based on GPS used to obtain the map at step 320 to touch where they are on the map (step 350). In this specific example, some additional input will be required to orient the path. Without that additional input, the path will lack an orientation given that this is a first visit ever to this location and the signal_snapshot lacks location-specific information. The additional input could come from a sensor, e.g. compass heading, from a second user touch, e.g. facing or "I'm here now" a few seconds later. The location is shown as $c_0$ for actual location to. Note initially the location displayed prior to receiving the input may have been elsewhere on the display (step 340); however, that initial "unanchored" location is not shown in FIG. 5.

As the user walks along the path from $t_0$ to $t_1$, the log file is maintained and a signal snapshot is constructed. The signal snapshot reflects the received WiFi transmissions from the wireless access points 232-238. The deviations between the computed path 510 from $c_0$ to $c_1$ versus the actual path 250 reflect the guesses chosen that are the best fit for the log data. In scenario 500, we have never visited this location so there is no occupancy data (e.g. the obstacles 222-228 are not reflected in a format usable by the process) and there is no pre-existing signal snapshot.

In contrast, FIG. 6 with scenario 600 shows a computed path 610 (again with markers $c_0$-to-$c_7$), which is a much closer fit to the actual path. Scenario 600 reflects a scenario after more visits where processes such as process 400 of FIG. 4 have been used to analyze log files and derive a more useful signal snapshot. In this example, five hundred customers with mobile devices (end points 130) have visited location 220 with the location software 159 transmitting log files to the location system 120. Process 400 was then used to construct a signal map that is more reflective of conditions based on multiple readings. That signal map can be used by mobile 131 in scenario 600 to more accurately determine a user's location. Additionally, in contrast to scenario 500 where the user input may have been necessary to locate $c_0$, in scenario 600, the combination of visible WiFi MAC addresses and their signal strengths is likely sufficient for initial location determination.

Contrasting the two results, is useful. In scenario 500, the computed path 510 shares many characteristics with the actual path 250 while in scenario 600, computed path 610 much more closely track the actual path 250. In scenario 500, GPS and/or user input was helpful for initial location determination whereas it was unnecessary in scenario 600. Other differences between the two scenarios may include greater reliance and/or weighting of non-WiFi fit functions in scenario 500 vs. scenario 600. Specifically, in scenario 500 inertial sensors (e.g. accelerometer, compass, gyroscope, heading, and the like) may be particularly important until an adequate signal snapshot is constructed. Alternatively, in lieu of inertial sensors, an occupancy map and/or user input, e.g. "here I am", can also be used to supplement the newly developing signal snapshot. Scenario 500 also highlights the fact that no preconditions were imposed on the location. No information was required about the locations of the wireless access points 232-238 and using a map in this example was a discussion and diagramming convenience only. Notably, even if only a single user is collecting data and doing it entirely offline, as the signal snapshot is refined by additional visits, both past and future location determination get better with time. Other embodiments that can improve a first visit/cold start to a location could include providing an intended walking path, e.g. user draws their planned path through the store.

In scenario 600, it may also be possible for the location system 120 to create an occupancy map based on prior visits and log files. For example, if across 500 paths through the store, nobody has ever walked where obstacle 222 is, then obstacle 222 could be blocked as occupied space/unwalkable for use as an input to fit functions on mobile devices.

Locations with more detailed histories may also allow for changes to sampling rates. For example, if an environment has tens-of-thousands of visits regularly, it may be possible to reduce sampling frequencies on the mobile devices to conserve power while maintaining accuracy. Even in heavily visited locations, some parts of the location may be less-frequently visited than others. So selectivity can be applied to data retention, e.g. ensure that less trafficked portions of a location have longer streams of data than more heavily visited areas.

Conclusion and Additional Embodiments

We have now described a system and processes that provide improved mobile location determination.

Some additional embodiments and features include:

When shopping/travelling in groups, being able to see and share the real-time and/or historical location of the other members of your party or your friends.

When taking or viewing photographs, being able to geo-tag photos and visually browse photos projected into a 2-d floor plan or 3-d environment interactively, with high, 1-3 m accuracy.

Interactive games and augmented reality, e.g.
  audio and/or video cues and/or in-game events can be automatically dispatched to users based on location coupled with the context of the application
  automatic check-ins whenever a user enters a particular point of interest
  rewards, leaderboards, or other incentives for capturing raw log files in locations that have not yet been added to location system (e.g. location system 120) and/or storage (e.g. storage 122).

In malls, hospitals, airports and other similar spaces:
  finding a route to a specific store, a restroom, gate, connecting flight, reception area, or other point of interest
  location-based search or real-time interactions with shops including line finding to identify shorter lines for checkout, ticket windows, check-ins, security screening
  facilities and building operators can use pedestrian location data analytics, this can facilitate measuring the efficiency of signage and printed maps for demand planning including tenant rent optimization or to measure the efficiency of physical advertising space and digital signage based on traffic patterns
  publication of targeted alerts, offers, or messages to only those patrons in a certain general location leaving messages, offers, alerts at a location so that the message is only triggered when someone walks by that location (for the first time, always, etc.). Along with location, the triggers can also be combined with time of day, other people's locations, and/or other application context to determine when to display the information.

Some additional features that may be present in museum embodiments include:
- interactive audio/video tours based on real-time or historical location that customize their content based on what path you take through the exhibits and/or interactively guide you to related exhibits
- location-based statistics, either real-time or historical analytics: e.g. "people in your demographic spend the most time at this exhibit", "this exhibit is the most popular this hour", "that exhibit has the shortest wait times right now"
- "call for assistance feature" alert the nearest staff member of your location Some additional features that may be present in hospital embodiments include:
- track the location in real-time of your friends, loved ones, or other members of your party; broadcast your location to nearby staff members; search, navigation and contextual interactions for patients and visitors
- location-based coordination tools for doctors, nurses, and other staff members
- integration with itineraries and schedules
- location monitoring for patient care Some additional features that may be present in office and campus embodiments include:
- real-time indicators of which shared rooms, e.g. conference or study rooms, are in-use vs. not; turn-by-turn navigation to the nearest shared room that is available; historical and/or real-time analytics about shared rooms usage, e.g. most vs. least and times of day
- broadcast, receive, and share real-time location of participants during meeting times if at least one member is not yet present.
- interactive reporting, e.g. "The light bulb in this room is broken"

Some additional features that may be present in location analytics embodiments:
- case studies and user research: play back an anonymous user's path through a store to learn about the nuances of their visit
- aggregate marketing optimization: translate mobile location and/or interaction events into web events, or their equivalents, for analysis in existing analytics engines, e.g., Coremetrics or Google Analytics.

Some additional features that may be present in ground team coordination embodiments include:
- real-time coordination for security teams, emergency response teams, cleaning staff, ushers, tour guides, and other ground teams
- context-based assistance, e.g. "the fuse box for this room is there".

Additionally, some embodiments focused on location tracking may include:
- tracking of personal items, pets, and infants
- safety applications, including but not limited to E911 and AGPS enhancement
- inventory and/or equipment tracking, e.g. warehouses, factories, hospitals Rather than provide a floor plan ahead of time, some embodiments may support automatic creation of estimated floor plans either interactively or based on:
- walking/movement patterns, e.g. areas that are never walked are more likely to be walls, furniture, or other obstructions; areas that are frequently walked are more likely to be unobstructed open space in rooms or hallway
- straight regions of sharper signal strength drops tend to be obstructions like walls and furniture
- points of interest and other meaningful locations can be tagged manually, e.g. from timestamp, position, photographs Other embodiments may provide contextual, location driven information for stadiums, arenas, hotels, resorts, cruise ships, and/or casinos.

Some embodiments provide proximity based social applications including:
- social networks that automatically form or remove connections—or adjust the strength of connection and/or group/circle—based on how often you spend time in close proximity
- cross-person device pairing and communication based on proximity, e.g. providing a "bump app" without the need to bump or direct device-to-device communication
- people-discovery based on interests coupled with where you spend your time, for example a social dating application could pair people who regularly visit the same park or a dine with someone application to pair groups up for dining at a conference Some embodiments may provide analytics for the individual, e.g. a "my places" and self-awareness tools.
- This could include displaying a list of commonly frequented locations. Features can include an indicator displaying "in" or "out", and time since last entry/exit, with "in" or "out" automatically determined from location context.
- "Learn about me" features can include using a personal mobile device as a data collection utility. Since the device can be active and close to your person most of the time, it can log information about you.
  - Signal snapshots and logs can be recorded and compared to determine when new locations are entered and when old locations are revisited.
  - New signal snapshots can be tagged, e.g. "Meeting room A".
  - The data can be analyzed to provide analytics including: time spent at a location "today", total time ever spent at a location, number of steps taken in old/new/all locations, number of calories burned, other people who have spent time at this location, how often "meeting room A" is used by you; a qualitative rating of adventurousness Some embodiments may provide assistive technology for users, e.g. blind, including:
- providing audio cues, directions, and information based on the context of the application, your precise location, and/or which direction you are heading. This can serve to provide specific navigation or as a general guide
- logging and/or tagging of previously visited locations before with alerts when you return to those locations, approach them, or leave them.

Some embodiments focus on monitoring and liability including:
- slip and falls: location tracking to verify whether an employee had already attended to the dangerous area prior to the accident occurring security services: location tracking to verify when a security guard most recently surveyed the site of an incident.

Some embodiments provide contextual remote controls based on location including:
  personalized remote control interface based on whether you are in the TV room, the den, or the kitchen with that customized and/or dynamic buttons and behaviors
  control of other devices (e.g., unlock car doors, stream music from your stereo) that respond to your proximity to the device
  alarms, reminders, and phone settings (e.g. vibrate vs. silent) based on what type of room you are in, e.g. living room vs. bedroom, classroom vs. library, and the application context Some embodiments may provide for direct interaction and visualization of signal strengths and/or locations of transmitters and/or receivers including:
  monitoring wireless coverage and performance, identify dead zones, etc.
  locating transmitters and/or receivers
  recommending locations to add a new access points Some embodiments can serve as a GPS substitute for pedestrian or vehicular positioning and/or navigation in areas where GPS services are poor, e.g. urban canyons.

Some embodiments include applications for importing, exporting, viewing, modifying, and/or analyzing all or parts of the generated path histories with respect to their raw log files, fit functions, sampling functions, and the resulting signal snapshots after they have been captured and determined. Such embodiments can include:
  regenerating signal snapshots and/or path histories in real-time and/or interactively if log files, constraints, or data points are changed/added/removed
  aligning, analyzing, or displaying floor plans or company information against the location data automatically or interactively
  visualization of the fit functions and/or sampling functions in the context of a particular dataset The improved mobile location systems described herein can provide a seamless and/or holistic location experience by launching other mobile applications, intents, and/or behaviors as a user enters or leaves locations In some embodiments, the approaches described herein are "flipped" around and performed from the server side. Thus, location determination occurs on the server using signal information from the transmitters and/or receivers coupled in communication with the server as opposed to measurements made on the mobile device itself.

In some embodiments, the determined location is represented as:
  a probabilistic or heuristic area/region denoting, e.g. a confidence interval
  qualitative descriptions such as the nearest point of interest or logical location (e.g. "just outside meeting room A", or "beside person B")
  graphically, for example probabilistic indicators that are darker in areas of higher probability and lighter in areas of less probability rather than just as coordinates (e.g. x, y or latitude, longitude)

In some embodiments, robots with motion capabilities are used to capture data. And the raw log file can include inputs from the robots' sensors. Applications include:
  interactive guidance and/or fully autonomous robot navigation, e.g. tele-presence robots travelling between locations, e.g. conference rooms, cubicles
  autonomous and/or low-manpower determination of signal snapshots and/or location information for an arbitrary indoor or outdoor location
  route planning to maintain network connectivity while intelligently handing off network access over, e.g. a sequence of wireless access points
  disposable devices or robotics designed to rapidly survey the signal snapshot for a given location by being transported or propelled, possibly in bulk, across the desired indoor or outdoor space while capturing raw log files and either processing them or uploading/transferring them to an external server for post-processing.

The improved mobile location systems described herein, where instead of a discrete software application, all or part of the location determination processes described herein are performed by:
  operating system kernel, driver, and/or software
  vendor-level systems, firmware, software
  chip-level systems, hardware implementations
  third-party applications that access the location determination via a library, SDK, or API In some embodiments, the process for location determination takes into account changes in the receiving environment including but not limited to: time of day, number of obstacles, number of users, pedestrian traffic, make and model and/or calibration parameters of the wireless signal receivers and/or transmitters.

The improved mobile location systems described herein can in some embodiments:
  solve jointly and/or simultaneously more than one floor and/or building at once
  incorporate and/or solve coarse-location and/or approximations to the user's location to distinguish between floors and buildings as fit functions and/or sampling functions
  identify discrete differences in MAC addresses, user interaction, availability of GPS and other traditional signal sources, and/or application context combined with this location system as fit functions and/or sampling functions. For example, spatial indexing (e.g. k-means clustering, quad-tree, oct-tree, or kd-tree data structures, discretization and bucketing, etc.) of MAC addresses by proximity to known buildings
  seamlessly or interactively transition from indoors-to-outdoors using these features In some embodiments, the outlier rejection (either in the environment, dynamic or static changes to the environment, or of log files, or of data points within log files) described herein is based on:
  consistency of the new data versus correlations with the outputs, for example, from past runs
  relative self-consistency of a particular group/class of measurements
  relative self-consistency of the given value versus other measurements in similar but different state space
  determining if a data point is an outlier by comparing its own signal strength error of one access point to the signal strength of another access point from the same corresponding space-time measurement positions In some embodiments, walkable locations are represented as a spatial connectivity graph and an assumption can be made that user(s) are more likely to be on the graph or on a different floor/building. This can limit the search space needed to identify where new data is likely to be located. When a new measurement arrives, it can be compared against the database versus distinct nodes in the graph resulting in fewer comparisons than for a full search over the state space or otherwise. There is no minimum number of APs/transmitters required.

Any data structures and code described or referenced above are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A method comprising:
   obtaining, by a mobile device from a server computer, a signal snapshot associated with a cell within a grid of contiguous cells that divide a map of an indoor space, where the cell is associated with a location in the indoor space and the signal snapshot includes one or more statistical parameters describing a probability distribution of received signal strength measurements of radio frequency (RF) transmissions from access points within the indoor space;
   adjusting the statistical parameters based on observations of RF transmissions from one or more neighboring cells in the grid of cells;
      obtaining, by the mobile device while the mobile device is operating in the indoor space, a set of received signal strength measurements of RF transmissions from the access points within the indoor space;
      receiving, by the mobile device, input from one or more sensors of the mobile device, wherein the one or more sensors include at least one of an accelerometer, gyro or magnetometer;
      applying, by the mobile device, one or more fit functions to the set of received signal strength measurements, the input and a path history associated with the indoor space, wherein applying one or more fit functions to the set of received signal strength measurements includes fitting the set of received signal strength measurements to the probability distribution using the one or more statistical parameters; and
   determining a location of the mobile device in the indoor space based on a result of applying the one or more fit functions to the set of received signal strength measurements, the input and the path history associated with the indoor space.

2. The method of claim 1, wherein the one or more statistical parameters include a mean and variance of the probability distribution.

3. The method of claim 1, wherein the grid is associated with at least one occupancy value which indicates one or more areas in the indoor space that are walkable or not walkable.

4. The method of claim 1, wherein the cell is initialized with statistical parameters associated with a plurality of cells in the grid.

5. A mobile device comprising:
   a receiver;
   one or more sensors; and
   a processor operable to:
      obtain, by the receiver, a signal snapshot associated with a cell within a grid of contiguous cells that divide a map of an indoor space, where the cell is associated with a location in the indoor space and the signal snapshot includes one or more statistical parameters describing a probability distribution of received signal strength measurements of radio frequency (RF) transmissions from access points within the indoor space;
      adjust the statistical parameters based on observations of RF transmissions from one or more neighboring cells in the grid of cells;
      obtain, by the receiver while the mobile device is operating in the indoor space, a set of received signal strength measurements of RF transmissions from the access points within the indoor space;
      receive input from the one or more sensors of the mobile device, wherein the one or more sensors include at least one of an accelerometer, gyro or magnetometer;
      apply one or more fit functions to the set of received signal strength measurements, the input and a path history associated with the indoor space, wherein applying the one or more fit functions to the set of received signal strength measurements includes fitting the set of received signal strength measurements to the probability distribution using the one or more statistical parameters; and
      determining a location of the mobile device in the indoor space based on a result of applying the one or more fit functions to the set of received signal strength measurements, the input and the path history associated with the indoor space.

6. The mobile device of claim 5, wherein the one or more statistical parameters include a mean and variance of the probability distribution.

7. The mobile device of claim 5, wherein the grid is associated with at least one occupancy value which indicates one or more areas in the indoor space that are walkable or not walkable.

8. The mobile device of claim 5, wherein the cell is initialized with statistical parameters associated with a plurality of cells in the grid.

9. A non-transitory, computer-readable storage medium having instructions stored thereon, which, when executed by one or more processors of a mobile device, causes the one or more processors to perform operations comprising:
   obtaining, by the mobile device from a server computer, a signal snapshot associated with a cell within a grid of contiguous cells that divide a map of an indoor space, where the cell is associated with a location in the indoor space and the signal snapshot includes one or more statistical parameters describing a probability distribution of received signal strength measurements of radio frequency (RF) transmissions from access points within the indoor space;

adjusting the statistical parameters based on observations of RF transmissions from one or more neighboring cells in the grid of cells;

obtaining, by the mobile device while the mobile device is operating in the indoor space, a set of received signal strength measurements of RF transmissions from the access points within the indoor space;

receiving, by the mobile device, input from one or more sensors of the mobile device, wherein the one or more sensors include at least one of an accelerometer, gyro or magnetometer;

applying, by the mobile device, one or more fit functions to the set of received signal strength measurements, the input and a path history associated with the indoor space, wherein applying the one or more fit functions to the set of received signal strength measurements includes fitting the set of received signal strength measurements to the probability distribution using the one or more statistical parameters; and determining a location of the mobile device in the indoor space based on a result of applying the one or more fit functions to the set of received signal strength measurements, the input and the path history associated with the indoor space.

10. The non-transitory, computer-readable storage medium of claim 9, wherein the one or more statistical parameters include a mean and variance of the probability distribution.

11. The non-transitory, computer-readable storage medium of claim 9, wherein the grid is associated with at least one occupancy value which indicates one or more areas in the indoor space that are walkable or not walkable.

12. The non-transitory, computer-readable storage medium of claim 9, wherein the cell is initialized with statistical parameters associated with a plurality of cells in the grid.

* * * * *

UNITED STATES PATENT AND TRADEMARK OFFICE
CERTIFICATE OF CORRECTION

PATENT NO.       : 9,749,780 B2  
APPLICATION NO.  : 13/983414  
DATED            : August 29, 2017  
INVENTOR(S)      : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Twenty-fifth Day of September, 2018

Andrei Iancu  
*Director of the United States Patent and Trademark Office*